(12) United States Patent  (10) Patent No.: US 6,649,877 B1
Mauffrey et al.  (45) Date of Patent: Nov. 18, 2003

(54) TOASTER WITH DEVICE FOR REHEATING ROLLS OR SIMILAR FOODS

(75) Inventors: Guy Mauffrey, Breuchotte (FR); Claude Loukachine, Remiremont (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/089,152

(22) PCT Filed: Sep. 26, 2000

(86) PCT No.: PCT/FR00/02654
§ 371 (c)(1),
(2), (4) Date: Mar. 27, 2002

(87) PCT Pub. No.: WO01/22856
PCT Pub. Date: Apr. 5, 2001

(30) Foreign Application Priority Data

Sep. 27, 1999 (FR) .............................. 99 12257

(51) Int. Cl.[7] .............................................. A47J 37/08
(52) U.S. Cl. ...................... 219/386; 219/399; 219/400; 219/392; 99/327
(58) Field of Search ............................... 219/386, 392, 219/385, 400, 405, 411, 414; 99/327, 337, 335, 357, 389, 385, 401

(56) References Cited

U.S. PATENT DOCUMENTS

| 2,659,295 | A | * | 11/1953 | Soccoli | 219/386 |
|---|---|---|---|---|---|
| 3,866,525 | A | * | 2/1975 | Oxel | 99/357 |
| 3,941,044 | A | * | 3/1976 | Goltsos | 99/401 |
| 5,193,439 | A | * | 3/1993 | Finesman et al. | 99/327 |
| 5,746,115 | A | * | 5/1998 | Yip | 99/357 |
| 6,267,044 | B1 | * | 7/2001 | Friel, Sr. | 219/386 |
| 6,341,554 | B2 | * | 1/2002 | Thiriat | 99/327 |

FOREIGN PATENT DOCUMENTS

FR 2806898 * 10/2001

* cited by examiner

Primary Examiner—Joseph Pelham
(74) Attorney, Agent, or Firm—Browdy and Neimark, P.L.L.C.

(57) ABSTRACT

The invention concerns a toaster comprising a frame arranged in a casing, at least a vertical grill chamber open at the top part of the casing, a peripheral roof at the opening of the grill chamber and integral with the toaster, having a top edge provided with openings for receiving rolls, heating elements located in the proximity of the grill chamber. The invention is characterized in that at least part of the edge of the rood is raised relative to the top part of the casing. Said integrated device for heating bread is associated with specially shaped grills for holding rolls, said grills comprising atop edge substantially perpendicular to said grills and oriented outwards of the chamber, so as to partially close the heating chamber, when they are brought closer to each other, thereby deflecting the ascending hot air flow generated by the heating elements.

11 Claims, 5 Drawing Sheets

TOASTER WITH DEVICE FOR REHEATING ROLLS OR SIMILAR FOODS

Figure 1:
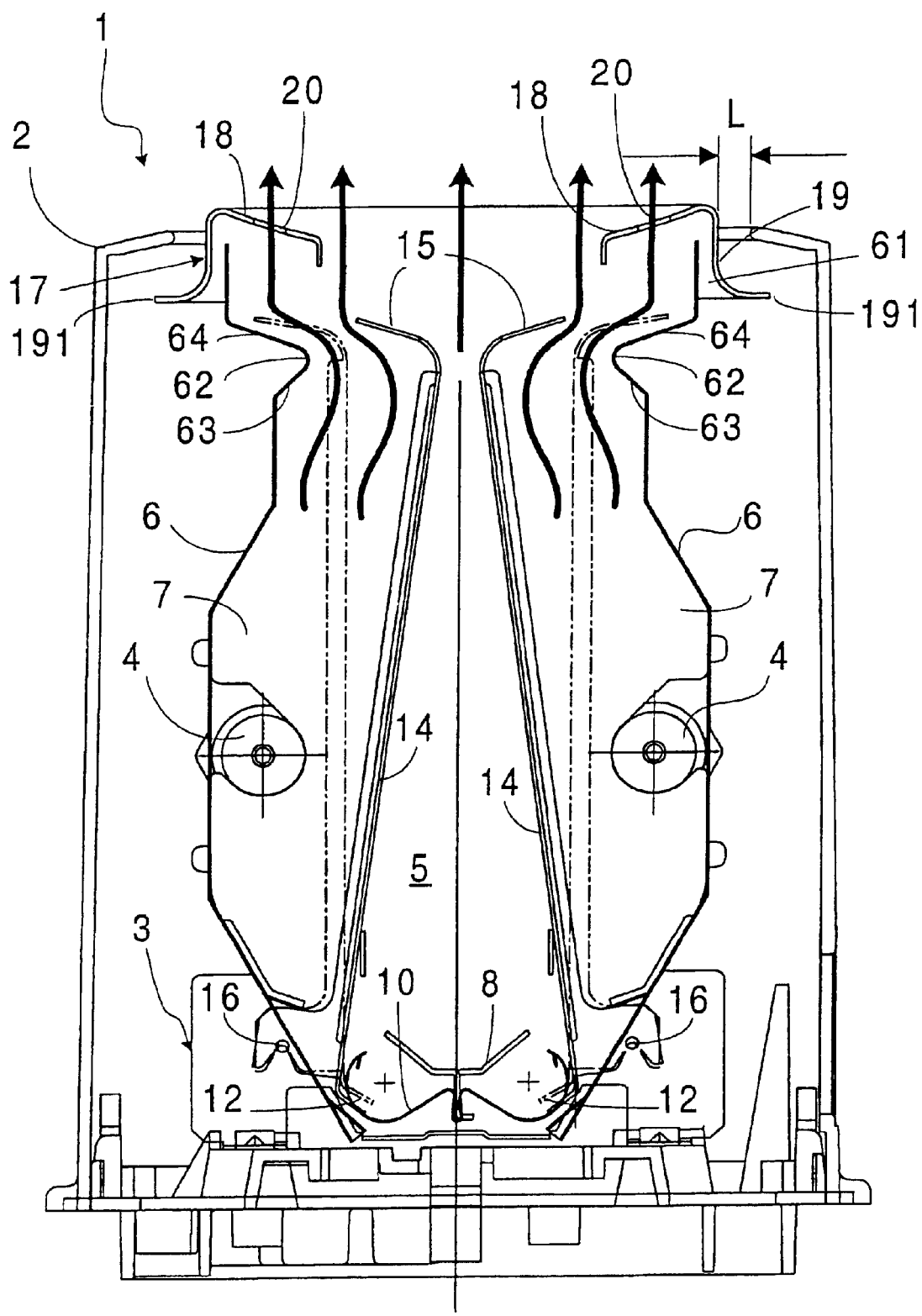

The present invention relates to the technical field of household electric cooking appliances of the toaster type and concerns more particularly a device for reheating rolls or pastries integrated into said toaster.

In this field, the reheating function is performed either with the aid of an additional removable accessory that comes to be positioned on the top of the toaster, or with the aid of an accessory integrated into the toaster, retractable when it is not used.

Thus, there is known, particularly from the document DE G 93 16 913.2, a toaster comprising a reheating means composed of two rigid metal wires unfoldable in rotation around an axis such as to form a support situated at a distance above the toaster. The breads and pastries placed on this support then have the benefit of the natural rising convection of the hot air exiting from the toaster. However, such a system results in rather long reheating times, due to the spacing of the wires from the toaster, while not guaranteeing a uniform reheating, the major part of the heat flow being located at the level of the opening above the heating chamber. Moreover, the mechanism for rotating the wires can deteriorate or sag under the weight of the food to be reheated. In addition, such a device is an element added to the toaster, requiring additional parts, particularly for the rotation of the wires, which increases the sale price of said toaster.

The patent DE G 91 15 161.9 describes a toaster having a removable reheating means composed of a receptacle where the bread rests on a grill. Below the latter is disposed a perforated diffuser to channel air from one side to the other of the bread that is placed to be reheated. Heat radiation is guided and reflected onto the lateral walls of the bread. This arrangement permits, certainly, a more efficient reheating of the bread than the wire devices, by a better distribution of the heat coming from the toaster, but it constitutes a cumbersome and complex accessory to the toaster and, by this fact, increases in a notable manner the price of the toaster. Moreover, in a utilization of the toaster for toasting of the slices of bread, this accessory must be removed and becomes cumbersome, and risks being lost.

The objective of the present invention is to overcome the problems presented by the prior art by proposing a toaster having a frame arranged in a casing, at least one vertical grilling chamber open at the upper part of the casing, a peripheral roof at the opening of the grilling chamber and forming a unit with the toaster, having an upper rim provided with openings, heating means located in proximity to the grilling chamber, characterized in that at least part of the rim of the roof is raised relative to the upper part of the casing.

Thus, the toaster retains its compact general form while being able to offer the possibility of reheating rolls, disposed on the rim of the roof without having elements that are removable or rocking, while avoiding causing the bread to rest directly on the casing that is generally of plastic, thus avoiding having it deteriorate.

This roof can be a sheet of steel or of metal material, but can equally be made of other nonmetallic materials such as heat resistant plastics, i.e. having thermomechanical properties adapted to the type of cooking performed in the appliance, permitting a cost reduction. Materials of the baked clay or ceramic type, possibly covered with a layer of enamel on the face intended to be in contact with food products can also be utilized, permitting, by their thermal inertia, maintenance of the food products in a heated condition. Other materials, such as glass, being able to be easily cleaned, are equally included in the field of the present invention.

According to a variant of construction of the invention, the rim of the roof has bosses, such as to present support points at different heights. These bosses permit either to raise at least a part of the rim of the roof with respect to the upper part of the casing, or, when the rim is entirely raised relative to the casing, to delimit hollow zones for an easier positioning of the bread. Moreover, these bosses can be provided to arrange passages for hot air under the bread which is thus heated in a more uniform matter.

Advantageously, the openings in the rim of the roof are located at the level of zones for positioning the bread. Rising hot air can then escape into the hollow parts resulting from the bosses, which aids a better distribution of the heat into the zones provided to receive the bread.

As a variation and/or a complement to the preceding form of construction, the rim of the roof slopes toward the opening of the heating chamber, permitting, on the one hand, to better seat pastries above the opening of the toaster, and, on the other hand, to avoid having the bread come in direct contact with the openings of the roof.

Advantageously, a peripheral space is arranged between the roof and the casing in order to isolate said casing from the roof, thus allowing utilization of plastic materials which have inferior technological properties and are thus inexpensive.

Advantageously, the roof is fixed to the frame of the toaster, thus facilitating formation of the peripheral space separating the rim from the casing. By extension, the roof and its rim are of sheet metal and result from an extension of the frame of the toaster, permitting economies in the number of pieces and the assembly time.

According to a variant of construction, the roof is connected to the casing by the intermediary of insulating ribs.

Advantageously, the grilling chamber is delimited by two gripping grills that are substantially vertical and able to be moved toward one another when the heating elements are supplied with electricity, said gripping grills having an upper rim that is substantially perpendicular to said grills and oriented toward the outside of the chamber, in a manner to partially close the heating chamber, when they approach one another, in order to thus deflect the flow of ascending hot air generated by the heating elements.

This configuration permits the heat generated by the heating elements to be deliberately distributed so that they are not concentrated only toward the central part of the chamber, the rim thus arranged acting as a deflector to divert the hot air.

The ascending hot air, partially diverted, is thus distributed, which aids a uniform heating of bread placed on the roof.

According to an advantageous variant, the rim of the roof presents, at its base, an exterior flange inclined at an angle $\alpha$ at least equal to 30° with respect to the horizontal.

This flange permits the flow of heat coming from the rear face of the reflector to be oriented towards the reheating zones while thermally protecting the casing.

Advantageously, reflectors are associated with the heating elements, said reflectors presenting, toward their upper extremity, a narrowing by the intermediary of two converging slopes. This narrowing is favorable to a good conservation of the heat in the toaster in its toasting mode, while permitting orientation of the thermal flux laterally, for a uniform reheating of bread disposed on the rim of the roof.

According to one form of construction of the invention, the toaster is constituted by two vertical heating chambers, by two lateral heating elements each situated between a heating chamber and the casing of the toaster, these two elements being connected electrically in series, as well as a central heating element situated between two heating chambers, and connected in parallel with the two lateral heating elements, a switch permitting disconnection of the two lateral elements in order to only supply current to the central heating element during the reheating operation.

This particularity permits, notably in the case of a high power toaster, to effectuate the reheating of rolls disposed on the rim of the roof emerging from the toaster, at a power that is relatively low and compatible with the desired reheating effect. Moreover, by only supplying current to the central heating element, losses toward the lateral wall of the casing are reduced.

Figure 1A:
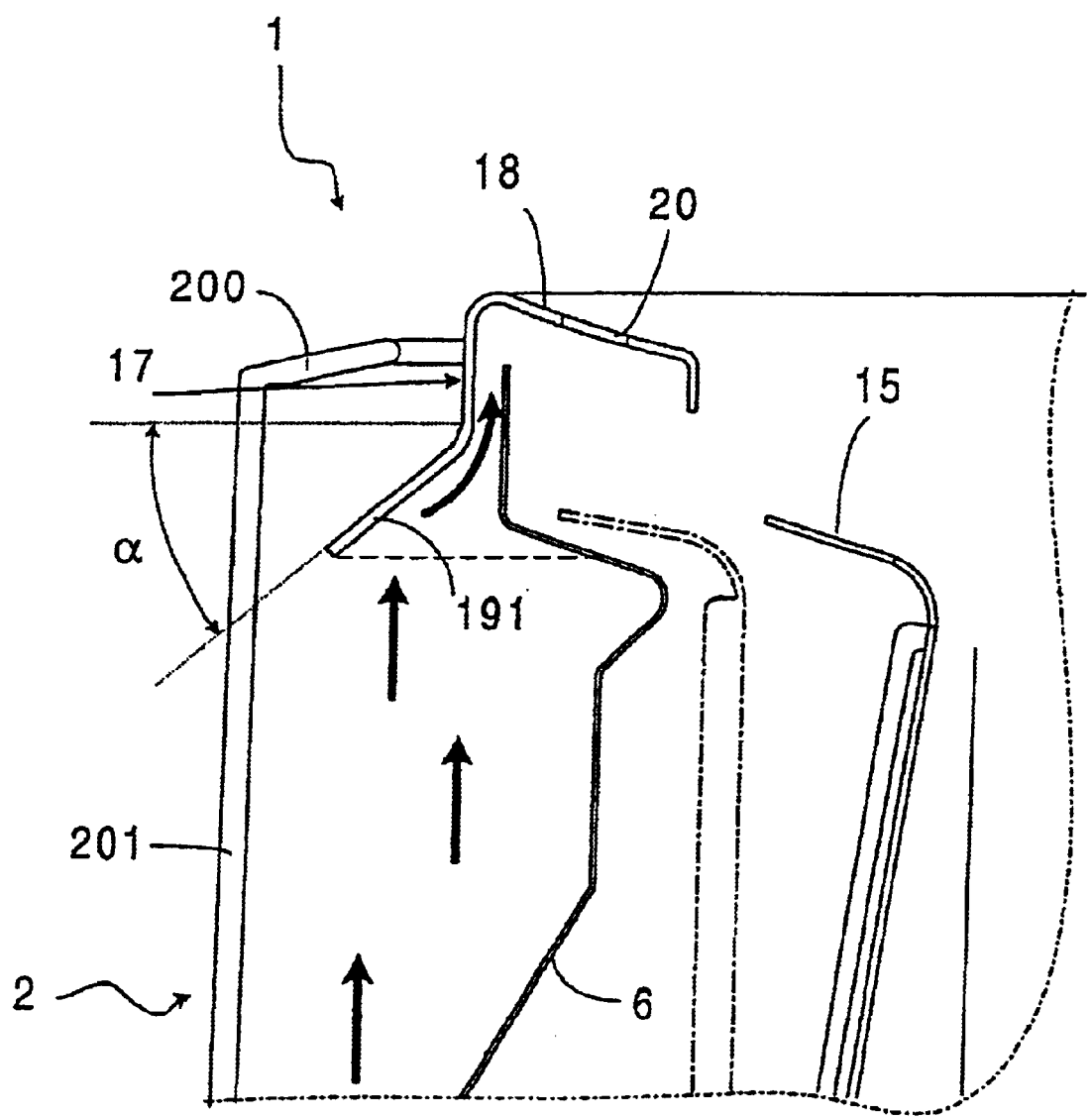
Figure 2:
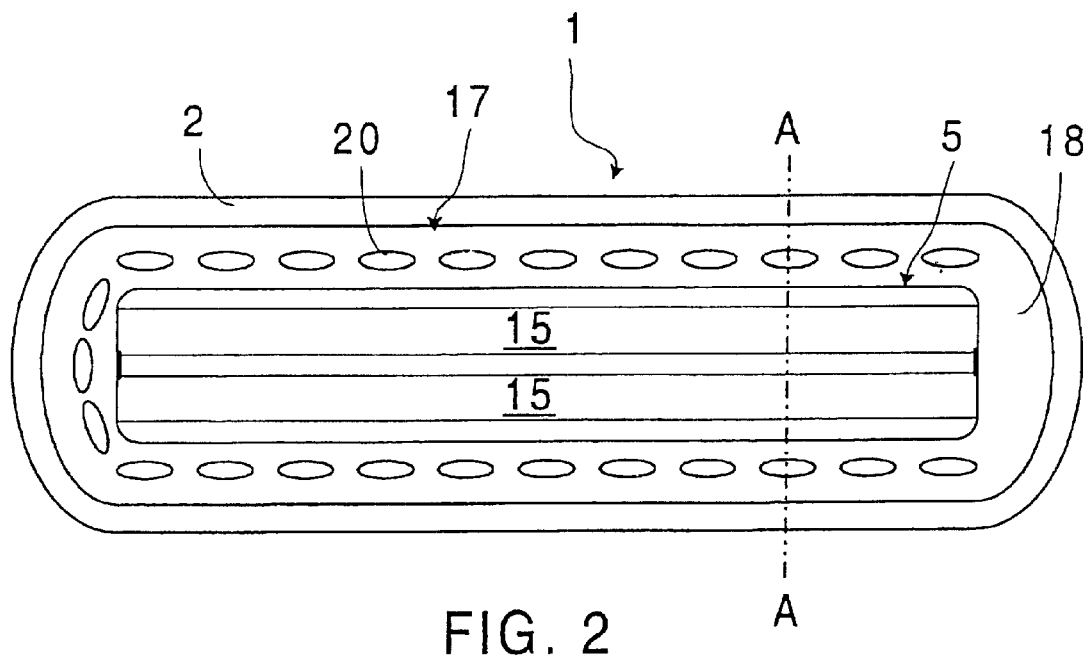
Figure 4:
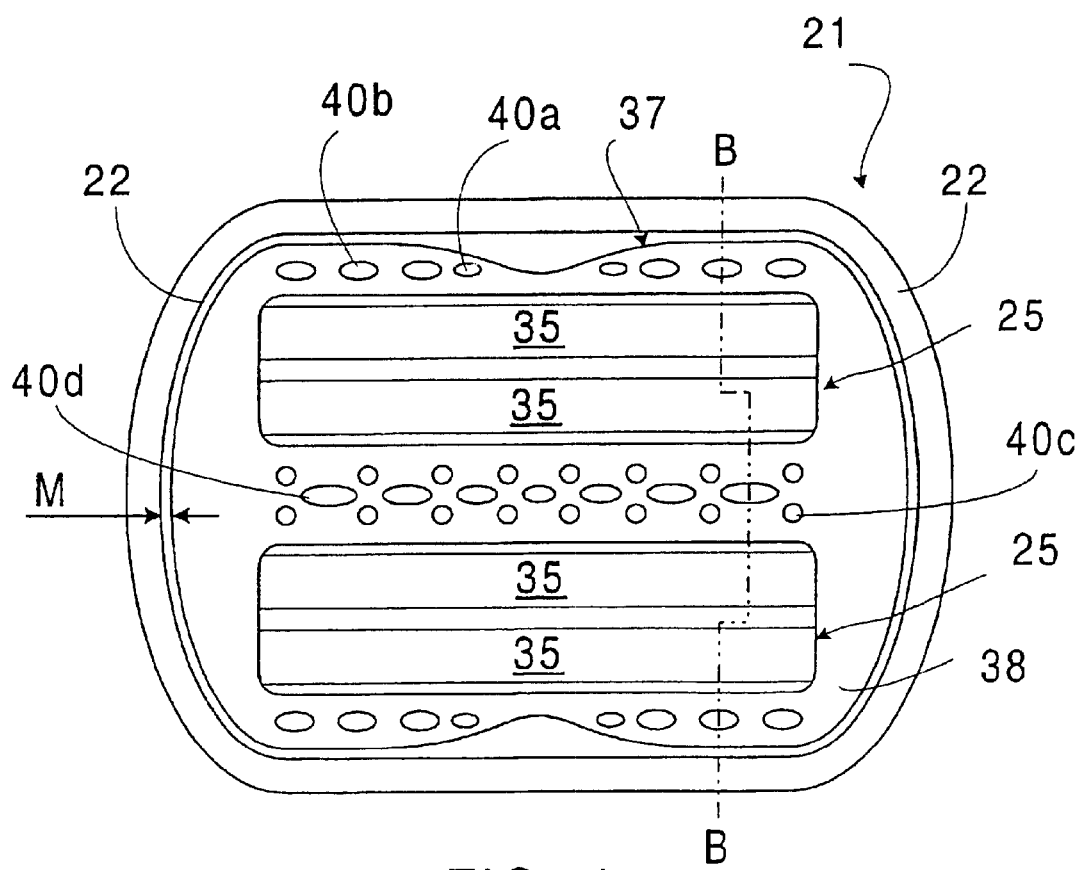
Figure 3:
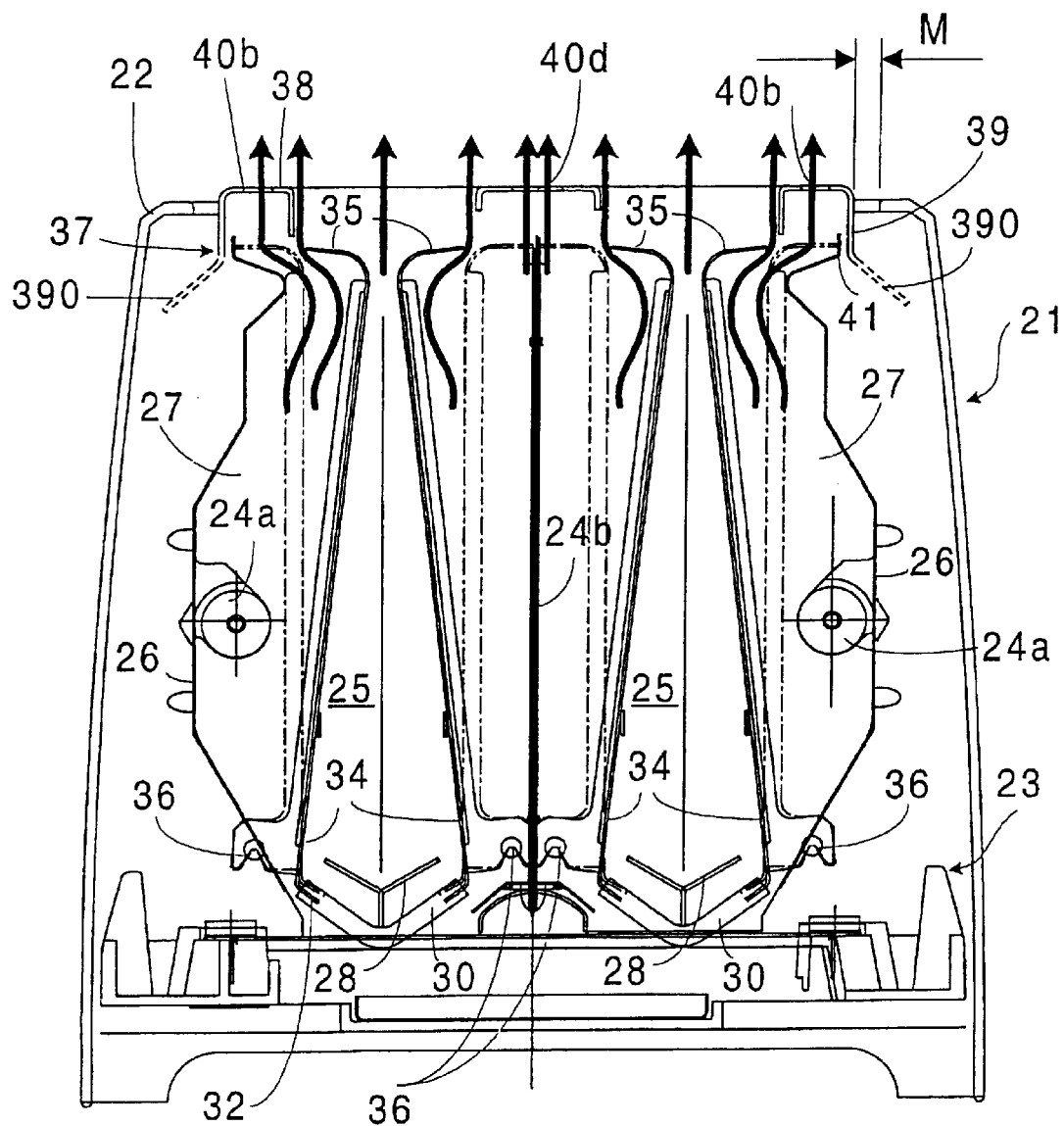
Figure 5:
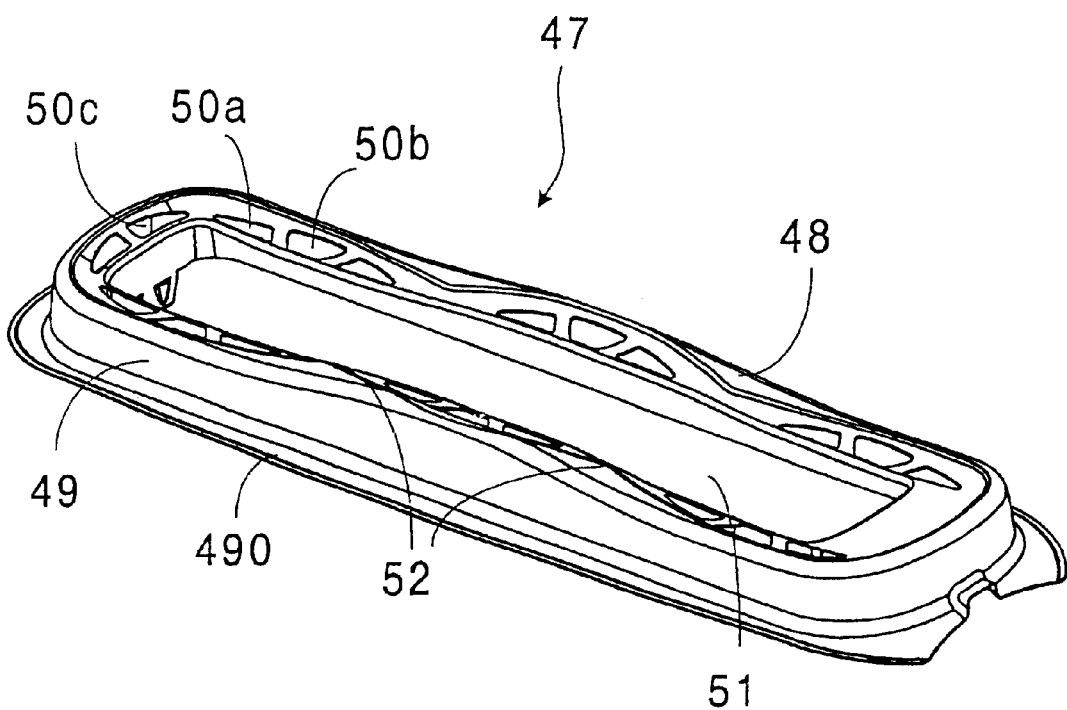

The present invention will be better understood with the aid of the description that will follow, with reference to the attached figures, given by way of non-limiting example, among which:

FIG. 1 is a transverse cross-sectional view along the axis A—A of FIG. 2 of a toaster having a grilling chamber, according to the present invention, FIG. 1A is a detail of the upper part of the toaster, according to a variant of construction, FIG. 2 is a partial top view of a toaster having a single grilling chamber according to FIG. 1, FIG. 3 is a transverse cross-sectional view along the axis B—B of FIG. 4 of a toaster having two grilling chambers, equipped with the present invention, FIG. 4 is a partial top view of a toaster according to FIG. 3, FIG. 5 presents a variant of construction of the heating device according to the invention.

As is visible in FIG. 1, toaster 1 according the present invention has a casing 2 possessing an upper opening and at the interior of which is arranged a frame 3 composed notably of two longitudinal reflectors 6 as well as two transverse walls 7 provided with recesses in which are positioned heating elements 4. Two grills 14 define a heating chamber 5.

As concerns the opening of the casing, in its upper part is arranged a roof in the form of a metal sheet 17 presenting a rim 18, a vertical wall 19 and, at its base, a flange 191.

As is visible in FIG. 1, the base, and, when it is present, flange 191 of the roof, as well as at least one part of vertical wall 19 of the roof, are located at the interior of the toaster, surrounded in a peripheral manner by casing 2.

Rim 18 is oriented toward the opening of the heating chamber, in a peripheral manner thereto, as is visible in FIG. 2. Rim 18 of metal sheet 17 has openings 20 of which the form, the dimensions and the distribution can vary according to the arrangement of the heating elements, the heating power.

By way of example, the holes presented have an elliptical form. To indicate the heating function, these holes can equally constitute pictograms, for example in having the form of croissants, in order to remind the user of the presence of this function on the toaster, such as shown in FIG. 5.

Advantageously, rim 18 of this metal sheet is not flat and can present bosses situated between the openings, and/or a slope depending on the width of the rim. Other configurations can be envisioned without departing from the framework of the present invention, the principle being to present bread support zones that are raised with respect to casing 2 and, advantageously, with respect to openings 20.

Out of concern for simplification of the assembly of the toaster and to reduce the number of parts of the toaster, metal sheet 17 forms a unit with frame 3. According to an advantageous variant, metal sheet 17 is an extension of frame 3.

According to another form of construction of the invention, metal sheet 17 forms a unit with the casing of the toaster, by the intermediary of insulating ribs, in order to reduce the transfer of heat from the metal sheet toward the casing.

According to the example proposed, the casing is a plastic casing. In order to not deteriorate this material or to avoid the use of a material that is too technologically advanced, resistant to high temperature, a minimum space L separates the metal sheet from the casing, except for the connections by the ribs when they exist. This space is not necessary if the casing can withstand high temperatures, but in the interest of safety for the user, it is important to limit thermal losses toward the wall of the casing in order to limit their temperature.

Two gripping grills 14, defining the heating chamber, are pivotable around a point 16 and have a curved part 12 at their end situated in the low part of the toaster, this curved part 12 being oriented toward the interior of the chamber. In this zone is equally found a spring blade 10 capable of being displaced by bread supporting carriage 8 when this latter is led into the low part of the toaster.

Gripping grills 14 at their opposite end, i.e., at the top of the heating chamber, are curved in such a manner as to present a rim 15 that is substantially perpendicular to the plane defined by the grills, this rim being oriented toward the outside of the chamber.

The operation of such a toaster, in its toasting function, is not modified by the present invention. A slice of bread is introduced into grilling chamber 5, supported on bread supporting carriage 8. This latter is led by the user into a low position by an arm extending out of the casing of the toaster or by an automatic process of decent of the bread supporting carriage. Upon arriving in the low part of the toaster, carriage 8 actuates spring blade 10 the ends of which interact with curved parts 12 of the grills 14 which pivot around points 16.

On FIG. 1 is indicated, in broken lines, the position of grills 14 when the carriage is in its loading/unloading position, while the representation in solid lines corresponds to the position of the grills when the toaster is in operation, i.e. when the heating elements are supplied with current.

The upper parts of the grills thus approach one another while gripping the bread. The bread supporting carriage is maintained by known means of the mechanical or electro-mechanical type in the low part of the toaster during the programmed toasting time or until the desired degree of toasting of the bread where the heating elements cease to be supplied with electricity. A mechanism then permits the bread supporting carriage to move upwardly to a position for discharging the bread. The grills then return to their original position. This constitutes a conventional operation of the toaster.

The integrated device for reheating rolls does not hinder the normal operation of the toaster, the metal sheet 17 being situated away from grilling chamber 5, rims 15 of grills 14 being oriented toward the outside of the chamber. The only modification concerns the evacuation of the heat oriented on the lateral sides of the toaster.

In order to better limit the increase in temperature of the casing, there can be provided a covering between vertical wall 19 and metal sheet 17 and an extension 61 of reflector 6, thus constituting a double wall of protection for the casing.

In its use for reheating rolls and similar food products, the principle remains similar to that of a toasting operation, except for the disposition of the bread, located on metal sheet 17 and not on the bread supporting carriage. By the same principle as previously described, grills 14 move toward one another under the action of displacement of bread supporting carriage 8. Under the effect of the supply of electricity to heating elements 4, ascending hot air rises in the toaster, by convection. The form of reflectors 6 as well as that of rims 15 of grills 14 permits the flow of central heat to be limited by retarding the convection and by orienting a part of said flux laterally.

As is illustrated in FIGS. 1 and 5 illustrating, respectively, relative scales of 1 and of ½, advantageous forms of the invention, the association of a certain width of rims 15, of a certain closing of the grills, and of the value of the opening of the chamber, represented by rim 18 of metal sheet 17, is calculated to reduce the heating to the value just necessary to prevent the bread from being blackened. Perforations in the rim of the metal sheet participate for this purpose by permitting hot air to escape in order to reheat the lateral faces of the bread while avoiding an unnecessary overheating in the cooking chamber.

Moreover, the upper part of reflectors 6 is equally carefully designed in order to not only retain heat within the toaster, but also to orient the latter toward openings 20 of the rim 18 of metal sheet 17 in the reheating mode.

Thus, the reflectors present a narrowing 62 having, to one side and the other, two slopes oriented toward the outside of the chamber, the first slope 63, at the side of the heating elements, permitting the heat to be turned toward the center of the toaster, while the second, 64, situated above the narrowing, orienting the heat toward the lateral parts of the toaster, the walls 61 participating in a channeling of the heat in to the openings 20.

It is to be noted that the upper part of the reflectors, thus composed of walls 61 and slopes 64, permits crumbs possibly coming from bread that has been placed to be reheated to be directed into the heating chamber and thus possibly toward a crumb-collecting drawer when the toaster is provided therewith, avoiding soiling zones situated between the heating chamber and the casing.

The principal heat flux is indicated by the heavy arrows in FIG. 1. It can thus be seen that the heat flux is distributed over substantially the width of the zone of the support of the bread on the metal sheet 17, which aids a uniform reheating of the bread.

The limitation of the central heat flux by rims 15 of the grills 14 is visible in FIG. 2 where are shown rims 15 leaving approximately the same opening between the two grills as between one grill and the casing.

According to a variant of construction presented in FIG. 1A, flange 191 of metal sheet 17 is inclined toward the bottom of the toaster at an angle α with respect to the horizontal. By this arrangement, heat rising in the toaster at the outside of the heating chamber, emitted from the rear face of reflector 6, and represented by arrows, is in part captured by the flange, but is equally oriented toward holes 20 acting as a reflector. This limits heating of upper part 200 of casing 2 of the toaster, while improving bread reheating performance.

A good effectiveness of this configuration is obtained for an angle α at least equal to 30°.

Manipulation is thus identical, whether in a utilization of toasting or of reheating, the only difference resulting in the positioning of the bread. This solution, without modification of the power, is advantageous because it does not require any special control for the reheating function, nor a different electric circuit for supplying the heating elements. According to this form of construction, it is suitable to limit to the maximum the heating of the casing, notably by a peripheral play L of at least one millimeter between the metal sheet and the casing.

According to a variant of construction of the invention, it can be provided to reduce the power when the user desires to reheat rolls. To this effect, several technological solutions are possible, for example a voltage divider bridge permitting lowering of the supply voltage of the heating elements, or an alternating cycle of on-off periods of the power supplied to the heating elements.

According to this form of construction, it is necessary to provide a selector button permitting activation of this power reduction function. This can be achieved with the aid of the time control button, thus reducing the interfaces with the user.

FIGS. 3 and 4 show the present invention on a toaster 21 having two heating chambers 25 in a casing 22 open at its upper part. A frame 23 has lateral reflectors 26 and transverse walls 27, these latters presenting recesses supporting heating elements 24a. A heating element 24b is located at the center of the toaster. By way of example, element 24b is a plate supporting a resistance heating wire, while elements 24a are bars of the quartz type, any other heating element being able to be utilized in the framework of the present invention.

Heating chambers 25 are delimited notably by grilles 34 that are able to pivot around points 36 and the end of which situated in the low part of the toaster have a curvature 32 oriented toward the inside of the toasting chamber, connected to a spring blade 30 that is able to be actuated by bread supporting carriage 28. Other systems for pivoting grills can be utilized without departing from the framework of the present invention.

As for the toaster with a single heating chamber, the end of grills 34 situated in the upper part of the toaster presents a rim 35 oriented toward the outside of the chamber in a manner to deflect the ascending flow of hot air generated by heating elements 24a, 24b.

In addition, a metal sheet 37, connected to frame 23 or to casing 22 by insulating ribs, surrounds heating chambers 25 at the level of the opening arranged in the casing. This metal sheet is raised with respect to the casing and presents a rim 38 having openings 40a, 40b, 40c, 40d distributed on the periphery of the metal sheet. According to the proposed example, the transverse sides are free of openings, but these sides can be provided therewith, as in FIG. 5, the choice depending on numerous factors connected with the reheating of rim 38.

This latter has an outside vertical wall 39. As in the preceding example, the form, size and distribution of the holes are selected in order to best distribute the flow of heat coming from the heating elements, in order to assure a good reheating, as shown in FIG. 3.

According to the proposed example, rim 38 is flat, but it can be furnished with bosses, as previously explained, in order to raise the bread or in order to delimit the reheating zones.

In order to limit thermal bridges towarsd the casing, a space M is arranged between metal sheet 37 and casing 22. In addition, reflectors 26 have an extension 41 covering vertical wall 39 of metal sheet 37 in order to constitute a double barrier for protection of casing 22.

The reflectors present, advantageously, a narrowing in their upper part, as previously explained.

Advantageously, metal sheet 37 can have a flange 390, illustrated in broken lines in FIG. 3, and inclined at an angle α, presenting characteristics and effects similar to the flange 191 previously described.

In a variant of construction, the flange is perforated, in order to balance the exchanges of heat from the flange toward, on the one hand, lateral wall 201 of casing 2, and on the other hand toward rim 200 of said casing.

The operation is identical to that presented in FIG. 1 and 2. Supply of electricity to the heating elements can be identical, in its functioning, to that of the toaster having a single opening as an example is presented in FIGS. 1 and 2.

By way of a variant, heating elements 24a in series can be coupled in parallel to central heating element 24b, in a manner such that the reheating leads uniquely to the supply of electricity to the central heating element. This arrangement could take over for a special position of the button for regulating the degree of toasting, for example, in order that the user can select this particular mode of operation of the toaster.

FIG. 5 presents another variant of construction of the reheating device. For this purpose, a metal sheet 47 is deformed in order to present a rim 48, a vertical wall 49 as well as a flange 490. A central opening 51 is provided, corresponding substantially to the opening of the heating chamber of the toaster. Rim 48 is equally furnished with openings 50a, 50b, 50c as well as bosses 52, delimiting, on the proposed example, 3 reheating zones easily identifiable by the user, that much more since openings 50a, 50b, 5Oc are provided in these zones.

These bosses 52 thus permit, not only to well maintain and support the bread in the hollow parts thus delimited, but equally permits the user to visually locate and identify the function of reheating the bread.

The present invention will not be limited to a roof presented in the form a metal sheet such as illustrated in the proposed example. It can be envisioned to use other materials, such as plastic, ceramics, glass, . . . without departing from the framework of the present invention, as long as these materials have thermomechanical characteristics compatible with the temperatures developed at the outlet of the heating chambers during cooking of bread.

What is claimed is:

1. A toaster (1, 21) having a frame (3, 23) arranged in a casing (2,22), at least one vertical grilling chamber (5, 25) open at the upper part of the casing (2, 22), a peripheral roof (17, 37, 47) at the opening of the grilling chamber (5, 25) and forming a unit with the toaster (1, 21), having an upper rim (18, 38, 48) provided with openings (20, 40a, 40b, 40c, 40d, 50a, 50b, 50c), heating means (4, 24a, 24b) located in proximity to the grilling chamber (5, 25), characterized in that at least part of the rim of the roof (17, 37, 47) is raised relative to the upper part of the casing (2, 22).

2. Toaster according to claim 1, characterized in that the upper rim (18, 38, 48) of the roof (17, 37, 47) has bosses (52), such as to present support points at different heights.

3. Toaster according to claim 2, characterized in that the openings (20, 40a, 40b, 40c, 40d, 50a, 50b, 50c) in the rim (18, 38, 48) of the roof (17, 37, 47) are located at the level of zones for positioning the bread.

4. Toaster according to claim 1, characterized in that the rim (18, 38, 48) of the roof slopes toward the opening of the heating chamber (5, 25).

5. Toaster according to claim 1, characterized in that a peripheral space (L, M) is arranged between the roof (17, 37, 47) and the casing (2, 22).

6. Toaster according to claim 1, characterized in that the roof (17, 37, 47) is fixed to the frame (3, 23) of the toaster.

7. Toaster according to claim 1, characterized in that the roof (17, 37, 47) is connected to the casing (2, 22) by the intermediary of insulating ribs.

8. Toaster according to claim 1, characterized in that the rim (18, 38, 48) of the roof (17, 37, 47) presents, at its base, an exterior flange (390, 490, 191) inclined at an angle α at least equal to 30° with respect to the horizontal.

9. Toaster according to claim 1, characterized in that the grilling chamber (5, 25) is delimited by two gripping grills (14, 34) that are substantially vertical and able to be moved toward one another when the heating elements (4, 24a, 24b) are supplied with electricity, said gripping grills (14, 34) having an upper rim (15, 35) that is substantially perpendicular to said grills and oriented toward the outside of the chamber (5, 25), in a manner to partially close the heating chamber, when they approach one another, in order to thus deflect the flow of ascending hot air generated by the heating elements (4, 24a, 24b).

10. Toaster according to claim 1, characterized in that reflectors (6, 26) are associated with the heating elements, said reflectors presenting, toward their upper extremity, a narrowing (62) by the intermediary of two converging slopes (63, 64).

11. Toaster according to claim 1, characterized in that it is constituted by two vertical heating chambers (25), by two lateral heating elements (24a) each situated between a heating chamber (25) and the casing (22) of the toaster, these two elements (24a) being connected electrically in series, as well as a central heating element (24b) situated between the two heating chambers (25), and connected in parallel with the two lateral heating elements (24a), a switch permitting disconnection of the two lateral heating elements (24a) in order to only supply current to the central heating element (24b).

* * * * *